United States Patent

Berthevas et al.

[11] Patent Number: 4,757,096
[45] Date of Patent: Jul. 12, 1988

[54] POLYURETHANE FROTH FOAMS

[75] Inventors: Paul R. Berthevas, Prevessin; Alain F. Fanget, Julien-en-Genevois, both of France

[73] Assignee: BP Chemicals Limited, London, England

[21] Appl. No.: 119,740

[22] Filed: Nov. 12, 1987

[30] Foreign Application Priority Data

Nov. 19, 1986 [GB] United Kingdom ............... 8627658
Aug. 6, 1987 [JP] Japan .................................. 8718636

[51] Int. Cl.⁴ ............................................. C08G 18/30
[52] U.S. Cl. ...................................... 521/163; 521/164; 521/167; 521/173; 521/174; 528/64; 528/66; 528/76; 528/85; 428/423.1
[58] Field of Search ............... 521/163, 164, 167, 173, 521/174; 528/64, 66, 76, 85; 428/423.1

[56] References Cited

U.S. PATENT DOCUMENTS

| | | | |
|---|---|---|---|
| 3,925,266 | 12/1975 | Fabris et al. | 521/126 |
| 4,048,105 | 9/1977 | Salisbury | 521/51 |
| 4,194,070 | 3/1980 | Marquis et al. | 521/163 |
| 4,239,700 | 12/1980 | Marquis et al. | 528/354 |
| 4,482,690 | 11/1984 | Orphanides | 528/64 |

Primary Examiner—John Kight
Assistant Examiner—Samuel A. Acquah
Attorney, Agent, or Firm—Brooks Haidt Haffner & Delahunty

[57] ABSTRACT

A process for the manufacture of a polyurethane froth foam is provided. The process, which comprises contacting a polyurethane forming formulation with an inert gas under conditions which produce a froth, uses a formulation which contains either (1) an aromatic amine having the formula

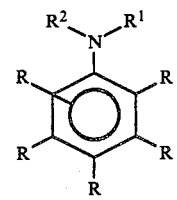

wherein the R groups are independently selected from hydrogen or alkyl groups and the $R^1$ and $R^2$ groups are independently selected from hydrogen or hydroxyalkyl groups or (2) an alkoxylated bisphenol A. Optionally a second additive which is a linear glycol can also be used. The polyurethane froth foams produced are thermoformable while exhibiting good shape retention at ambient temperature.

18 Claims, No Drawings

POLYURETHANE FROTH FOAMS

The present invention relates to novel polyurethane froth foams for use as a backing for coverings such as carpets or upholsterey. In particular, the invention relates to novel polyurethane froth foams which can be formed or moulded into shape when hot and which retain their shape when cold.

The production of polyurethane froth foams, for use as a backing for coverings such as carpets, artificial grass, sports surfaces and the like, is a known process. Such polyurethane froth foams can be prepared, for example, by mixing a two-component reactive polyurethane-forming mixture with an inert gas (e.g. nitrogen, air etc), under froth-generating conditions of high shear, usually in the presence of catalysts and froth stabilisers. The polyurethane-forming mixture is chosen so that it reacts slowly thereby allowing ample time for a froth to be formed in the mixer.

Once the polyurethane froth has been formed it is usually contacted, in an uncured state, with an appropriate covering substrate, e.g. vinyl sheet, textile tufts, etc, to produce the finished foam backed covering. The finished foam backed covering is then cured at elevated temperature. A typical example of this process has been described in detail in Cellular Polymers Vol 4, Pages 179–183 (1985).

Foam backed coverings produced by the process described above are flexible but exhibit no shape retention. For some applications however, for example in the automotive industry, there is a demand for coverings which show shape retention at amtiant temperatures but which are thermoformable, i.e. mouldable or formable at elevated temperatures. Such materials have the advantage that they can be bought or manufactured in sheet form and subsequently thermoformed into the complex shapes required to cover the interiors of automobiles.

One approach to rendering such coverings thermoformable is to incorporate into the covering a thermoplastic rigid polymer such as a polypropylene, a polyester, a polyamide or a polycarbonate. This can be done for example by bonding a sheet or a non-woven fleece of the thermoplastic rigid polymer to the covering or by incorporating a thermoplastic rigid polymer in powder form into the polyurethane froth foam.

A new method of rendering polyurethane froth foamed backed coverings thermoformable has now been discovered which avoids the need to use a thermoplastic material. The new method involves modifying ths structure of the polyurethane by incorporating into the polyurethane froth foam forming mixture chain extenders which render the cured polyurethane froth foam thermoformable whilst at the same time keeping it sufficiently stiff at ambient temperatures to give good shape retention.

Accordingly, the present invention provides a process for the manufacture of a polyurethane froth foam which process comprises contacting a polyurethane forming formulation with an inert gas under conditions which produce a froth of the polyurethane forming formulation characterised in that the polyurethane forming formulation comprises a polyfunctional isocyanate, a polyfunctional alcohol, and a chain extender which is either (1) an aromatic amine having the formula

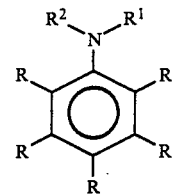

wherein the R groups are independently selected from hydrogen or alkyl groups and the $R^1$ and $R^2$ groups are independently selected from hydrogen or hydroxyalkyl groups, or (2) an alkoylated bisphenol A.

The function of the chain extender is to render the final cured polyurethane froth foam thermoformable. In principle any aromatic amine defined by the formula

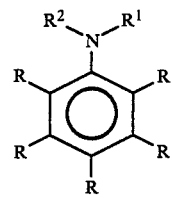

wherein the R groups are independently selected from hydrogen or alkyl groups and $R^1$ and $R^2$ are independently selected from hydrogen or hydroxyalkyl groups, can be used. However, it is usually desirable to select an aromatic amine which does not itself catalyse the polyurethane forming reaction otherwise the formulation may harden before it has been frothed or applied to the appropriate covering substrate. For this reason it is desirable to avoid using aromatic amines of the above formula where both $R^1$ and $R^2$ are hydrogen.

By the term hydroxyalkyl group is meant hydroxy functionalised alkyl groups such as $-(CHR)_nOH$ where n is an integer between 1 and 20 or hydroxy functionalised poly(oxyalkylene) groups of formula $-(CH_2CH_2O)_m(CH_2CH(CH_3)O)_pH$ where m and p are independently zero or an integer between 1 and 6. Ths oxyethylene and oxypropylene groups may be arranged randomly or in a block form in such groups. Suitable groups include $-(CH_2)_2OH$ groups, $-CH_2CH(CH_3)OH$ groups, $-(CH_2CH_2O)_qH$ and $-(CH_2CH(CH_3)O)_qH$ (where q is either 2 or 3) groups and the like. Preferably the alkoxy group is either $-CH_2CH_2OH$ or $-(CH_2CH_2O)_2H$.

Although the aromatic amine can be used pure it will be appreciated that during the preparation of such materials, which typically involve alkoxylating the corresponding amine, a mixture of products alkoxylated to differing levels are produced. Such mixtures of the aromatic amines can also be used in the process of the invention. Of course when such mixtures are used the values of the integers m, n, p and q as measured by standard techniques will assume an averaged value which may be non-integer.

As regards the R groups, these are independently selected from hydrogen or alkyl groups. Preferably the R groups are either hydrogens or $C_1$ to $C_4$ alkyl groups.

A preferred aromatic amine is a mixture corresponding to the averaged formula

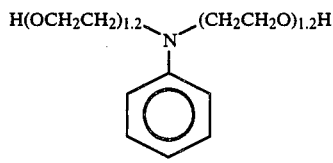

Alternativaly the additive is an alkoylated bisphenol A, preferably one alkoylated with between 1 and 6 moles of either ethylene oxide, propylene oxide or mixtures thereof per mole of bisphanol A.

Polyurethane froth foam formulations containing the additive of the present invention produce cured froth foam with a satisfactory degree of shape retention at or near room temperature and which are thermoformable at temperatures below 200° C. Such cured froth foams when heated can be easily thermoformed by the action of mechanical or vacuum pressing.

Whilst ths cured froth foams described above have the advantage that they are easily thermoformed and have adequate shape retention characteristics, it has also been found, in an embodiment of the present invention, that the shape retention characteristics can be further improved by having a second chain sxtendsr present in the froth foam formulation.

Accordingly, in an embodiment of the present invention there is provided a process for the manufacture of a polyurethane froth foam which process comprises contacting a polyurethane forming formulation with an inert gas under conditions which produce a froth of the polyurethane forming formulation characterised in that the polyurethane forming formulation comprises a polyfunctional isocyanate, a polyfunctional alcohol, a chain extender as described above and a second chain extender comprising a linear glycol.

The effect of the second chain extender is to improve the rigidity and hence shape retention of the cured froth foam. Suitable examples of linear glycols include, monoethylene glycol, monopropylene glycol, diethylene glycol, dipropylene glycol and the like. Most preferred is monoethylene glycol.

Since the two chain extenders influence the properties of the cured froth foam in different ways it will be appreciated that the properties of the final foam will be influenced by (a) the relative proportions of the two and (b) the absolute proportions of each in the polyurethane foam forming formulation.

Considering first the relative proportions of the two chain extenders, it can be said that in general the higher the proportion of the linear glycol relative to the aromatic amine the better the shape retention and the worse the thermoformability of the cured foam. Hence for most applications thsre is a compromise between having good shape retention and having a cured foam which is thermoformable at a temperature below which thermal degradation of the foam occurs.

As regards the absolute levels of the two chain extenders, the more second chain extender there is present, the more shape retentive the final product will be whilst the more first chain extenders there is present the easier it will be to thermoform the product. Preferably, each chain extender is present in amounts corresponding to less than 20% by weight of the polyfunctional alcohol used.

As mentioned earlier, it is desirable that the cured polyurethane foam should be thermoformable at a temperature below which thermal degradation occurs. In practice this means that the polyurethane foam should be thermoformable at a temperature of less than 200° C., preferably in the range 130°-180° C.

The polyfunctional isocyanates which can be used in the present process will be known to those skilled in the art. Suitable examples include individual or mixtures of the isomers of aromatic diisocyanates such as tolune diisocyanate (TDI), xylene diisocyanates and the like; difunctional aliphatic or cycloaliphatic isocyanates having between 2 and 18 carbon atoms, preferably 4-12 carbon atoms and isomers and oligomers of di(4-isocyantophenyl) methane (MDI). Preferably the polyfunctional isocyanate is MDI, an MDI prepolymer, an MDI variant or mixture thereof. In addition to the above, prepolymers of polyfunctional isocyanates and polyfunctional alcohols or amines can be used.

Although the polyfunctional alcohol used can be any alcohol having two or more reactive hydroxyl groups it is suitably a polyether polyol. The term polyether poyol, which is well known in the art, includes alkylene oxide adducts of (1) low molecular weight diols and triols or naturally occurring polyols (2) non reducing sugars and derivatives thereof (3) phosphoric, phosphorus, and polyphosphoric acids. Examples of such adducts are the alkylene oxide adducts of ethylene glycol, propylene glycol, glycerol, trimethylol propane, the isomeric butanediols, hexanediols, octanediols and the like. Alkylene oxide adducts of pentaerythritol, sorbitol, arabitol, mannitol, alkyl glucoside, alkylene glycol, glucosides and glycerol glucosides are also contemplated, as are adducts of alkylene diamines and hydrazines.

In the general it is desirable that the alkylene oxide used to form the adduct is a lower alkylene oxide having from 2 to 4 carbon atoms. Preferred examples are ethylene oxide, propylene oxide, the butylene oxides or mixtures thereof.

Polyether polyols containing addtional polymeric matter, e.g. Polymer polyols, may also be employed. Mixtures of polyether polyols or mixtures of polyether polyols and polymer polyols can be used.

When both chain extenders are used for balanced thermoformability and shape retention, a mixture of polyfunctional alcohols and polymer polyols is tailored to obtain the desired mechanical properties of the final froth foam. When emphasis is placed upon easy thermoformability, e.g. for vacuum forming applications, the first chain axtender is used as above together with small amounts of ethylene glycol and the polyfunctional alcohols are preferably diols together with higher functionality polyfunctional alcohols and/or polymer polyols used in smaller amounts as required to obtain the correct mechanical properties.

In addition to the components described above, the polyurethane froth foam formulation may also contain other additives (e.g. surfactants catalysts fillers etc.) which are routinely used in making froth foam.

The polyurethane forming formulations of the present invention can be frothed using standard techniques, coated onto an appropriate covering substrate and thereafter cured. It has been found that polyurethane froth foam backed coverings containing the additives described above, and in particular those produced according to the present invention, show particularly good shape retention/thermoformability properties without the weight and processing disadvantages of prior art materials. This is particularly so when the thickness of the polyurethane froth foam is less than 0.5 cm.

The invention is now illustrated by the following Examples.

EXAMPLES 1–6

Six polyurethane foam formulations were prepared according to the compositions given in Table 1. Each formulation was frothed with air in a Mondomix Mixer 'T-Model' and knife coated onto release paper. Each froth coating was then cured in an oven at 150° C. for 5 minutes to form a frothed elastomer sheet of 0.35 cm thickness. The thermoformability and shape retention at ambient and 80° C. of each were measured. The results are given in Table 1.

Polyurax polyol PPG 2025=2000 MW polypropylene glycol (ex BP Chemicals).
Polyurax polyol U2022=Polymer polyol ca 20% by weight 50/50 styrene acrylonitrile copolymer in 5000 MW polyether polyol CP-3 (ex BP Chemicals).
Niax chain extender HL 565=1 mole of aniline ethoxylated with 2.4 moles of ethylene oxide (ex Union Carbide Corporation)
Polyurax RA 4006=Quaternised fatty amine salt (ex BP Chemicals).

EXAMPLES 7–8

Two further polyurethane froth formulations were prepared according to the compositions given in Table 2. Example 7 used Dionol 220 (ex Akzo Chemie) as the aromatic amine and Example 8 used Isonol 100 (ex Dow Chemical). Each formulation was treated as for Examples 1 to 6 and a 0.35 cm thick frothed elastomer sheet produced. The results of the thermoformability and shape retention tests are also given in Table 2.

Isonol 100=1 mole of aniline propoxylated with 2 moles of propylene oxide.
Dionol 220=1 mole of bisphenol A ethoxylated with 4 moles of ethylene oxide.

EXAMPLE 9

A polyurethane froth foam formulation comprising:

| | parts by weight |
|---|---|
| Polyurax PPG 20.25 | 84 |
| (polypropylene glycol M.W. = 2000) | |
| Niax chain extender HL 565 (ex UCC) | 15 |
| Polyurax RA 4006 (ex BP Chemicals) | 1 |
| Polyurax SF 114 | 1 |
| (silicone surfactant ex BP Chemicals) | |
| Polyurax CF 116 (catalyst ex BP Chemicals) | 2 |
| Barium Sulphate | 350 |
| Polyurax Isocyanate IS 5 (ex BP Chemicals) | 42 | was prepared and frothed in a Mondomix Mixer 'T-model' and knife coated onto release paper as described in Example 1.

The resulting foam was vacuum formable at 170° C. and exhibited satisfactory shape retention at ambient temperature.

The terms 'Mondomix', 'Polyurax', 'Niax', 'Isonol' and 'Dionol' are registered trade marks.

The shape retention and thermoformability tests have been described recently in the SPI-FSK proceedings (Aachen) 'Polyurethane World Congress'—October 1987—paper by P. Berthevas, A. Fanget and G. Catouillat. However tests to demonstrate such problems can easily be developed by those skilled in the art.

TABLE 1

| Formulation (parts per hundred parts of polyol blend) | EXAMPLE | | | | | |
|---|---|---|---|---|---|---|
| | 1 | 2 | 3 | 4 | 5 | 6 |
| Polyurax Polyol PPG 2025 | 70 | 70 | 67 | 66 | 64 | 65 |
| Polyurax Polyol U 2202 | 20 | 20 | 20 | 20 | 20 | 20 |
| Niax Chain Extender HL565 (ex UCC) | 4 | 5 | 5 | 6.5 | 9.5 | 7 |
| Monoethylene Glycol | 4 | 5 | 7 | 6.5 | 6.5 | 7 |
| Polyurax Additive RA4006 | — | — | 1 | 1 | 1 | 1 |
| Polyurax Silicone Surfactant SF114 | 1 | 1 | 1 | 1 | 1 | 1 |
| Polyurax Catalyst CF115 | 1 | 1 | 1 | 1 | 1 | 1 |
| Barium Sulphate | 300 | 300 | 300 | 300 | 300 | 300 |
| Polyurax Isocyanate IS-5 | 44 | 51.4 | 63.7 | 63.1 | 62.5 | 66.6 |
| Froth Cup Density (g/l) | 1350 | 1300 | 1350 | 1350 | 1350 | 1350 |
| Cured Froth Density (g/l) | 900 | 900 | 900 | 900 | 900 | 900 |
| Thermoformability (150° C./5 mins) | | | | | | |
| Open U-shaped | 10/10 | 10/10 | 10/10 | 10/10 | 10/10 | 10/10 |
| Closed U-shaped | 10/10 | 10/10 | 10/10 | 10/10 | 10/10 | 10/10 |
| Shape Retention | | | | | | |
| Open U-shaped (ambient) | 5/10 | 5/10 | 6/10 | 7/10 | 8/10 | 8/10 |
| Closed U-shaped (ambient) | 7/10 | 7/10 | 8/10 | 8/10 | 8/10 | 8/10 |
| Open U-shaped (80° C.) | 2/10 | 2/10 | 3/10 | 5/10 | 4/10 | 6/10 |
| Closed U-shaped (80° C.) | 5/10 | 5/10 | 6/10 | 6/10 | 6/10 | 8/10 |

TABLE 2

| Formulation | EXAMPLE | |
|---|---|---|
| (parts per hundred parts of polyol blend) | 7 | 8 |
| Polyurax Polyol PPG 2025 | 67 | 67 |
| Polyurax Polyol U 2202 | 15 | 20 |
| Monoethylene Glycol | 7 | 7 |
| Isonol 100 (ex Dow Chemical) | — | 5 |
| Dionol 220 (ex Akzo Chemie) | 10 | — |
| Polyurax Additive RA 4006 | 1 | 1 |
| Polyurax Silicone Surfactant SF114 | 1 | 1 |
| Polyurax Catalyst CF115 | 1 | 1 |
| Barium Sulphate | 300 | 300 |
| Polyurax Isocyanate IS-5 | 63 | 63.2 |
| Froth Cup Density (g/l) | 1400 | 1400 |
| Cured Froth (g/l) | 920 | 950 |
| Thermoformability (150° C./5 mins) | | |
| Open U-shaped | 10/10 | 10/10 |
| Closed U-shaped | 8/10 | 10/10 |
| Shape Retention | | |
| Open U-shaped (ambient) | 6/10 | 3/10 |
| Closed U-shaped (ambient) | 8/10 | 5/10 |
| Open U-shaped (80° C.) | 3/10 | 1/10 |
| Closed U-shaped (80° C.) | 6/10 | 3/10 |

We claim:

1. A process for the manufacture of a polyurethane froth foam which process comprises contacting a polyurethane forming formulation with an inert gas under conditions which produce a froth of the polyurethane forming formulation characterised in that the polyurethane forming formulation comprises a polyfunctional isocyanate, a polyfunctional alcohol and a chain extender which is either (1) an aromatic amine having the formula

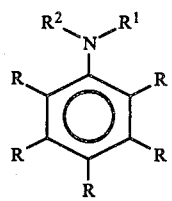

wherein the R groups are independently selected from hydrogen or alkyl groups and the $R^1$ and $R^2$ groups are independently selected from hydrogen or hydroxyalkyl groups, or (2) an alkoxylated bisphenol A.

2. A process as claimed in claim 1 characterised in that at least one of $R^1$ and $R^2$ is a hydroxyalkyl group.

3. A process as claimed in claim 2 characterised in that at least one of $R^1$ and $R^2$ is a hydroxyalkyl group having either the formula $-(CH_2)_nOH$, where n is an integer between 1 and 20, or the formula $-(CH_2CH_2O)_m(CH_2CH(CH_3)O)_pH$ where m and p are independently zero or an integer between 1 and 6.

4. A process as claimed in claim 3 characterised in that at least one of $R^1$ and $R^2$ is a hydroxyalkyl group selected from the group consisting of $-(CH_2)_2OH$, $-CH_2CH(CH_3)OH$, $-(CH_2CH_2O)_qH$ and $-(CH_2CH(CH_3)O)_qH$ where $q$ is either 2 or 3.

5. A process as claimed in claim 1 characterised in that the aromatic amine is a mixture corresponding to the average formula

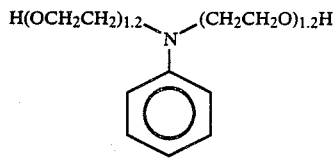

6. A process as claimed in claim 1 characterized in that the alkoxylated bisphenol A is one alkoxylated with between 1 and 6 moles of ethylene oxide propylene oxide or mixtures thereof per mole of bisphenol A.

7. A process as claimed in claim 1 characterised in that the polyurethane forming formulation further comprises, as a second chain extender a linear glycol.

8. A process as claimed in claim 7 characterised in that the linear glycol is selected from the group consisting of monoethylene glycol, monopropylene glycol, diethylene glycol and dipropylene glycol.

9. A process as claimed in claim 8 characterised in that the linear glycol is monoethylene glycol.

10. A process as claimed in claim 1 characterised in that the first chain extender comprises up to 20% by weight of the total polyfunctional alcohol used.

11. A process as claimed in claim 7 characterised in that the second chain extender comprises up to 20% by weight of the total polyfunctional alcohol used.

12. A process as claimed in either claim 1 or claim 7 characterised in that the polyfunctional alcohol is a diol.

13. A mixture consisting essentially of (a) up to 20% by weight of a chain extender as defined in claim 1, (b) up to 20% of a second chain extender as defined in claim 7 and (c) one or more polyfunctional alcohols.

14. A polyurethane froth foam backed covering comprising a covering substrate bonded to a layer of cured polyurethane froth foam produced by a process as claimed in either claim 1 or claim 7.

15. A polyurethane froth foam backed covering comprising a covering substrate bonded to a layer of cured polyurethane froth foam containing up to 20% by weight of the additive defined in claim 1.

16. A polyurethane froth foam backed covering comprising a covering substrate bonded to a layer of cured polyurethane froth foam containing up to 20% by weight of the additive defined in claim 1 and up to 20% by weight of the additive defined in claim 7.

17. A polyurethane froth foam backed covering as claimed in claim 14 characterised in that the layer of cured polyurethane froth foam is less than 0.5 cm thick.

18. A process for preparing a polyurethane froth foam backed covering which comprises coating a covering substrate with a layer of a froth of a polyurethane forming formulation as defined in either claim 1 or claim 7 and thereafter curing the froth.

* * * * *

UNITED STATES PATENT AND TRADEMARK OFFICE
CERTIFICATE OF CORRECTION

PATENT NO. : 4,757,096
DATED : July 12, 1988
INVENTOR(S) : Paul R. Berthevas et al It is certified that error appears in the above-identified patent and that said Letters Patent is hereby corrected as shown below:

Col. 1, l. 34 "amtiant" should read -ambient-

Col. 2, l. 44 - "Ths" should read -The-

Col. 3, l. 9 -"Alternativaly" should read -Alternatively-

Col. 3, l. 12, "bisphanol" should read -- bisphenol --.

Col. 3, l. 20, "ths" should read -the-

Col. 3, l. 25, "sxtendsr" should read -extender-

Col. 3, l. 54 "thsre" should read -there-

Col. 4, l. 49, "axtender" should read -extender-

Col. 6, l. 16, delete period (.) after "exhibited"

Cols. 5 and 6 - Table 1 "6.5" should read -5.5- --,(under
      Example 5)

Signed and Sealed this

Eleventh Day of April, 1989

*Attest:*

DONALD J. QUIGG

*Attesting Officer*     *Commissioner of Patents and Trademarks*